Patented Sept. 6, 1949

2,481,414

UNITED STATES PATENT OFFICE 2,481,414

STABLE FORTIFIED MILK PRODUCTS AND PROCESS OF PREPARING SAME

George E. Grindrod, Oconomowoc, Wis., assignor to Wisconsin Alumni Research Foundation, Madison, Wis., a corporation of Wisconsin No Drawing. Application April 30, 1945,
Serial No. 591,226

11 Claims. (Cl. 99—11)

1

The present invention relates to the fortification of milk and milk products, and is particularly concerned with the provision of an evaporated, canned and sterilized milk containing all of the vitamins, including ascorbic acid, naturally present in milk, together with a metal or metals of the anti-anemia group iron, copper and manganese.

The metals of the anti-anemia group are known to be essential in the production of red blood corpuscles, to control hemoglobin formation, and to have a great influence on the rate and vigor of growth of infants. Although these metals naturally occur, to a greater or lesser extent, in most cow's milk, the natural supply is generally deficient. The deficiency tends to impair the growth and vigor of an infant, subsisting wholly or largely on such milk, unless the same is met by the administration of the metals, in some assimilable form, from a separate source. This fact situation would indicate the great desirability of associating additional supplies of the anti-anemia metals with such deficient milk.

However, it is impracticable to add active forms of said metals to milk or to fluid products of milk. Said metals normally are known to be incompatible—except for relatively very short periods of time—with the oxidizable vitamins and with the butter fat of milk because they tend to catalyze or accelerate the rate of oxidation of such vitamins and the rate of rancidification of the fats. When active forms of the metals, e. g., relatively water-soluble salts of the metals, are added, as such, to fresh milk, they cause rancidity before the milk can, in ordinary course, be delivered and consumed; when added to milk to be canned, they cause it to become unfit for use within a few days.

It had been proposed to overcome this circumstance by adding to the milk water-insoluble powders, such as the phosphates and the phytates, of the anti-anemia metals. However, when the phosphates, phytates or other insoluble compounds are pulverized to the extent necessary to put them in suspension they react chemically with the milk and become ionized sufficiently to exert catalytic effect: the powders also act catalytically by direct contact.

Accordingly, it heretofore had been "conventional" separately to administer supplies of the anti-anemia metals by capsule. While feeding by capsule is now to a limited extent standard practice, there exists the disadvantage—over and above the fact that it is cumbersome, and that it sometimes is difficult to administer the capsules to the infant—that such practice reaches only a minor proportion of the infants needing it and is generally available only to those having the best medical care. To make these factors available to all, it is believed most beneficial to incorporate them, in some stable form, into the milk supply. Particularly desirable is the provision of a canned evaporated milk containing the metallic factors in the correct proportions and in a form compatible with oxidizable vitamins and with fats, while being activatable by the gastric juice, together with ascorbic acid and/or other vitamins—either retained or added; such a product, made widely available, is expected to have a pronounced and far-reaching effect in improving the average growth and vigor of infants.

In order that milk may be fortified with the metallic factors, I have found that the metals must be in a non-ionizing state, totally inactive chemically while in the milk, but capable of resuming chemical activity upon entering the digestive tract. I have succeeded in stabilizing the metallic factors in milk, including canned milk, by producing a complex colloidal structure wherein the metallic constituents become the nuclei of water-insoluble, assimilable colloidal particles, these particles being suspended in the milk but totally inactive while so suspended. Inactivation depends, not upon use of an insoluble compound alone, but where necessary upon producing an adsorption reaction whereby the metallic compounds, existing in the state of a colloidal dispersion, are encapsulated in protective sheaths, e. g., become the nuclei of larger water-insoluble colloidal particles the outer structure of which does not contain metallic constituents. If the adsorption reaction is caused to take place in a medium of about the same acidity as the milk serum in which the colloid is to be suspended, then the adsorbed colloid will remain stable for an indefinite period of time. Whether the preferred protective colloid is casein alone or a combination of albumin and casein is not essential. Other assimilable protective colloids, such as zein or soy bean protein, can be used. Adsorption of casein and of other colloids can be produced by a combination of heat and agitation.

The initial metallic dispersion may consist of any one of several assimilable compounds of one or more of the anti-anemia metals. It is essential that the dispersed compound be one readily produced in a state of subdivision approaching the colloidal. It should be substantially insoluble in milk serum. In my copending application Serial No. 585,005, filed March 26, 1945, entitled "Inactivated compounds of anti-anemia metals,"

there are described certain complexes operable herein, said complexes consisting essentially of near-colloidal nuclear particles of poorly soluble or water-insoluble compounds of the anti-anemia metals which nuclear particles may be individually encapsulated in adsorbed sheaths, layers or coatings of substantially water-insoluble, assimilable protective colloid. The nuclear compounds may be caseinates, phytates, vitaminates, phosphates, or other poorly soluble organic or inorganic compounds of one or more than one element of the group consisting of copper, iron, and manganese in which the salt-forming radical is substantially assimilable and is compatible with components of the milk product into which said encapsulated particles are to be incorporated. By the expression "a vitaminate of a metal of the group consisting of copper, iron, and manganese" is meant (see Milas Patent No. 2,296,291) a compound produced by replacing by the metal in question the hydrogens of the hydroxyl groups of as many mols of vitamin A or vitamin D or vitamin E as correspond to the valence of the copper, iron or manganese (as the case may be), according to the equation:

$$nROH + MgR'X + MeR'_n \rightarrow$$
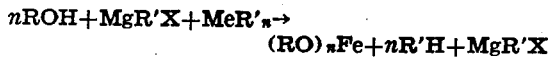

wherein R represents the hydrocarbon portion of the vitamin, R' represents alkyl, Me represents a metal of the group consisting of copper, iron, and manganese, and $n$ represents the valence of Me. The colloidal reaction by which the encapsulation of the nuclear particles is affected does not change the chemical structure either of the nuclear particles or of the adsorbed assimilable protective colloid: the product is an enlarged particle consisting of the metal-containing nucleus carrying an outer (adsorbed) layer of assimilable colloid which latter is free from anti-anemia metals.

For preparing liquiform milk products fortified by the aforesaid encapsulated metal compounds I prefer that these latter be freshly prepared and still moist, or even in suspension in a suitable liquid, when being incorporated into the milk product.

The process by which evaporated milk is so fortified may be generally stated as follows:

I can utilize the above described reaction as follows: The metallic complex, prepared as a soft colloidal mass, is mixed with concentrated skim milk, or with a viscous casein solution, and dispersed therethrough by means of a colloid mill or equivalent device. The particles of the complex separate from each other and produce a condition analogous to that of an emulsion. A cream-like material is produced. The metallic content of the cream is variable, amounting in some instances to as much as 0.5% or more but generally averaging between 0.2% and 0.1%. This fluid material although composed of insoluble particles approaching colloidal size, will not separate after mixing into milk or similar fluid, provided the pH of the fluid is approximately that of the colloidal cream. The metallic constituents are found to be totally unreactive with constituents of milk. They have no effect on ascorbic acid, do not promote rancidity of butter fat, and do not promote oxidation. The compounds appear to be permanently stable in canned milk, and do not enter into any reaction with the acids of the milk serum.

Both the metallic colloid and the milk into which it is incorporated will show absence of metallic ions in the serum. If the serum is separated from the colloidal mass, as by centrifuging or filtering, the serum will give negative chemical tests for the metals. But if either the metallic colloid or the milk containing it is placed in a weak solution of hydrochloric acid corresponding to the acidity of gastric juice, and incubated, the encapsulating assimilable colloid and the metal compound itself will go into solution and the metals will become ionized. Positive chemical tests for the metals will then be obtained. The metallic constituents thus become reactivated and assimilable soon after being taken into the digestive tract.

The above procedure of dispersing the metallic complex with casein or concentrated skim milk is a preferred procedure. A minor portion of the milk to be fortified can be used as the dispersing medium. This method, while practicable, is less desirable because some butter fat may be brought into contact with the metallic compounds, and some ascorbic acid may be lost in the dispersing process.

Other edible colloidal substances than skim milk or casein may successfully be used as the dispersing medium, e. g., soy bean protein, cereal mixtures containing protein and starch, etc. But for the purpose of making a fortified milk, there is no apparent advantage in using other food materials.

The herein described methods and principles have been applied to the manufacture of a fortified, canned evaporated milk intended for use as an infant food. This product has great value. Evaporated milk, now the most widely used infant food, heretofore has not been successfully fortified as to its contents both of ascorbic acid and of the anti-anemia factors. On account of the nutritional importance of the fortified canned evaporated milk product of the present invention, the preferred procedure for producing it is described in further detail as follows:

A supply of the dispersed metallic complex is prepared in advance. This product will be required in quantity representing about 3% of the weight of the finished fortified milk. The proportion of the complex should be such that, after adding to the milk, each liter of whole milk—or its equivalent in concentrated milk—will contain not less than the following:

10.0 mg. of iron calculated as metallic iron, and
1.0 mg. of copper calculated as metallic copper, without or preferably with
1.0 mg. of manganese calculated as metallic manganese.

In the concentrated milk or evaporated milk the ratio of metals to milk is generally the following:

0.25 mg. of copper per 100 grams of evaporated milk
0.25 mg. of manganese per 100 grams
2.50 mg. of iron per 100 grams.

The whole milk is preheated and concentrated in accordance with good commercial practice. This means that the milk should not be damaged by either bacterial action or by oxidation prior to its use. It must also be processed in apparatus which is substantially free of copper and iron, as such. These metals, incorporated from equipment, will cause damage to the finished product and must be excluded from the product to be fortified with these metals just as they are excluded, in good commercial practice, from other milk products. The concentrated milk should be cooled air-free. Internal cooling equipment is preferred. The concentrate will be air-free as it leaves the evaporator, and should be protected from air thereafter. The natural ascorbic acid content of the milk may be retained by air-free handling after evaporation. The concentrated milk should be accumulated in a storage tank by displacement of an inert gas, e. g., nitrogen, as a preferred procedure. After accumulation of a sufficient batch of the concentrate, the milk is analyzed for its content of ascorbic acid, and additional ascorbic acid may be added to make up any deficiency. The calculated proportion of the dispersed metallic complex fortifying material is then added and mixed. The concentrate may be otherwise standardized as to composition and density.

Since it is desirable to produce a finished product retaining its full proportion of ascorbic acid, and with no oxidation damage, the standardized product must be filled into cans with practical absence of air. This is best accomplished by heating the milk to near the normal boiling point, in a closed passage heater, as it flows to the filling machine. Cans are closed immediately in a steam atmosphere, and the filled, sealed cans pass immediately to the inlet of a rotary pressure sterilizer. The sterilization is carried somewhat beyond the point, as to time and temperature, required for sterilization and to that point where additional adsorption of casein upon the particles of metallic dispersion begins to take place. Microscopic examination will show the beginning of clumping of the colloidal particles, the clumped particles being within the range of microscopic visibility. This produces an improved degree of physical stabilization.

The above canning technique makes it possible to eliminate free oxygen from the product being canned to a limit of about 0.4 cc., or 0.6 mg., per can of 450 mgs., i. e., to between 1 and 2 parts of oxygen per million. This is opposed to the 15 to 20 parts of oxygen per million obtaining in freshly canned evaporated milk produced under prior commercial "vacuum canning" practices. I prefer so to effect the canning that the freshly canned product contains not more than about 2 parts of free oxygen per million.

The finished product possesses characteristics which distinguish it from any canned milk or other form of milk heretofore known. The presence of dietary sufficiencies of both copper (or iron, or manganese, or combinations thereof) and ascorbic acid, in the same product, is believed to be unique. The canned product will show, upon analysis, copper in proportion exceeding 1 mg. per liter of fresh milk equivalent, together with ascorbic acid. The proportion of ascorbic acid will remain unchanged over a prolonged period of time, six months and more.

The nutritional distinction from any other evaporated milk is marked. The product may be distinguished from any milk heretofore known by its nutritional effect when fed to young rats. If fed as the sole food to young rats, it will produce a rate and extent of growth approximately 70% greater than produced in rats (of equal age and weight) fed either natural milk or evaporated milk as heretofore made. For each 100 units of growth in rats fed natural milk or its equal, approximately 170 units will be found in the rats fed on the new product. The distinction is sufficiently marked to permit the use of this test to identify the new product.

Fresh milk, or pasteurized milk fortified in the same manner as above described for making evaporated milk but without concentration, will possess the same characteristics as the fortified evaporated milk. Fresh or pasteurized milk loses ascorbic acid appreciably within 48 hours if placed in bottles not vacuum sealed. If fortified with the above described encapsulated metallic colloid, it will be affected by contact with air at the same rate as it would have been affected without the fortification. This is a distinction from fresh milk heretofore fortified with the metallic constituents in active form, which milk has become rancid at an accelerated rate and has lost its ascorbic acid at an accelerated rate.

The invention will now be described further with reference to the following illustrative examples:

*Example 1*

To air-free concentrated milk, standardized as to ascorbic acid content and as to composition and density for canned evaporated milk (corresponding in solids content to 1 liter of whole milk in each 450 grams of concentrate), there is added an amount of an air-free aqueous dispersion of near-colloidal particles of iron, copper and manganese phytates, encapsulated in adsorbed coatings of zein, calculated to add to each unit of 450 grams of said concentrated milk:

10.0 mg. of iron calculated as metallic iron,
1.0 mg. of copper calculated as metallic copper, and
1.0 mg. of manganese calculated as metallic manganese.

The resulting admixture is heated, out of access to air, to a temperature near the normal boiling point, in a closed passage heater, as it flows to the filling machine; the fluid is filled into cans and the cans are sealed in a steam atmosphere. The sealed cans are thereupon sterilized in a pressure sterilizer to the point where additional adsorption of casein upon the encapsulated metal phytate particles begins.

*Example 2*

Whole milk is concentrated by known technique to a density and composition conventional for canned evaporated milk. The concentrated milk is cooled and de-aerated, and is maintained in air-free condition while it is standardized for ascorbic acid content.

A mixture of iron, copper and manganese phosphates, in the approximate weight ratio of 10 to 1 to 1, is finely pulverized and the powder is dispersed in an aqueous dispersion of soy bean protein by means of a colloid mill. The resulting material, which is an apparently homogeneous "cream," is then subjected to heating and simultaneous violent agitation by means of jets of high pressure steam, the heating and agitation being continued until the individual near-colloidal particles of metal phosphate are encapsulated within adsorbed coatings of the protein by the colloidal reaction so induced.

The resulting dispersion of encapsulated metal phosphate particles is then incorporated at substantially room temperature and in an air-free condition into the standardized evaporated milk in an amount calculated to add, to each 100 grams of the latter, 2.50 mg. of iron,
0.25 mg. of copper, and
0.25 mg. of manganese.

The so fortified evaporated milk is then heated, canned and sterilized in the manner described in Example 1 above.

Example 3

In this example the encapsulated anti-anemia metal compounds used for fortifying the evaporated milk are iron and copper vitaminates of vitamin D, in the approximate weight ratio of 10 to 1, and the metal vitaminate particles are encapsulated in adsorbed coatings of casein and colloidally suspended in skim milk.

To 450 parts by weight of cooled, air-free concentrated milk, corresponding to 1000 liters of whole milk, and containing 60 grams of added ascorbic acid, there is added an amount of the aforesaid metal vitaminates dispersion, in air free condition, calculated to give, in each 450 grams of said concentrated milk, 10.0 mg. of iron calculated as metallic iron, and 1.0 mg. of copper calculated as metallic copper.

The resulting fluid admixture is heated, out of access to air, to an elevated temperature short of the normal boiling point, and is filled into cans and the cans sealed in an atmosphere of steam. The sealed cans are then sterilized, in a pressure sterilizer, to the point where additional adsorption of casein upon the encapsulated metal vitaminate particles begins.

Example 4

Water-insoluble caseinates of the metals iron, copper and manganese are prepared by reacting soluble salts of these metals, in the approximate weight ratio of 1 unit of metal to 100 units of casein of concentrated skim milk and are colloidally dispersed in the latter—and simultaneously heated therewith—as described in my copending application, Serial No. 588,893, filed April 17, 1945, entitled "Colloidal compounds containing metallic ions in inactive state," whereby the individual particles are encapsulated in adsorbed coatings of casein and the so-encapsulated particles are colloidally dispersed in the medium. The resulting "cream," after being de-aerated, is incorporated into cooled, air-free concentrated whole milk containing ascorbic acid, in an amount calculated to add 25 mg. of iron and about one-tenth that amount of copper and of manganese, to each kilo of said concentrated milk, and the resulting admixture is heated out of access to air to a temperature near the normal boiling point. The heated mixture is filled into cans, and the cans sealed, in a steam atmosphere, whereafter the cans are sterilized in a pressure sterilizer to a point at which clumping of the colloidal particles begins.

It is to be understood, in connection with Examples 1, 2 and 4 above, that one metal (e. g., copper) compound only, or two only of the compounds of the three metals named (e. g., iron and copper), may be substituted for the three metal compounds; also, in connection with Example 3, that the encapsulated vitaminates may include all three of the anti-anemia metals. It is to be understood, further, that the concentrations of the encapsulated metal compounds in the milk products fortified therewith may be varied, within reasonable limits, as the occasion requires.

I claim:

1. The process of producing a liquiform food product fortified with at least one of the metals of the group consisting of copper, iron, and manganese, which comprises dispersing a water-insoluble salt of the metal into an assimilable protective colloid, causing the protective colloid to become adsorbed upon the dispersed particles of the metallic compound, and incorporating the resulting dispersion into the liquiform food.

2. The process of producing a liquiform food product fortified with at least one of the metals of the group consisting of copper, iron, and manganese, which comprises dispersing a water-insoluble salt of the metal into an assimilable protective colloid, causing the protective colloid to become adsorbed upon the dispersed particles of the metallic compound, incorporating the resulting dispersion into the liquiform food, and canning and sterilizing the resulting product.

3. The process of producing an evaporated milk product fortified with at least one of the metals of the group consisting of copper, iron, and manganese and containing an oxidizable vitamin, which comprises concentrating whole milk, admixing with the cooled concentrated milk a dispersion, in a liquiform dispersion of an assimilable protein, of near-colloidal particles of a water-insoluble salt of said metal the individual particles of which are encapsulated within adsorbed coatings of a water-insoluble assimilable protein, heating the resulting admixture, out of access to air, to a temperature near the normal boiling point, canning the heated admixture out of access to air, and sterilizing the canned product.

4. The process defined in claim 3, wherein the water-insoluble salt of the metal is a phosphate.

5. The process defined in claim 3, wherein the water-insoluble salt of the metal is a phytate.

6. The process defined in claim 3, wherein the water-insoluble salt of the metal is a vitaminate of a vitamin of the group consisting of vitamin A, vitamin D and vitamin E.

7. As a new product, evaporated, canned and sterilized milk containing a dietary sufficiency of ascorbic acid and a colloidal suspension of assimilable protein-encapsulated particles of water-insoluble salts of at least one of the metals of the group consisting of iron, copper and manganese in which the salt-forming radical is substantially assimilable and is compatible with components of the evaporated milk product.

8. An evaporated milk product, characterized by the presence of a water-insoluble salt of a metal of the group consisting of copper, iron, and manganese, in which salt the salt-forming radical is substantially assimilable and is compatible with components of the evaporated milk product, encapsulated in a proteinous colloidal structure and present in the evaporated milk in sufficient quantity to prevent nutritional anemia, said metal salt being dispersed in the evaporated milk in gravitationally inseparable condition, said evaporated milk product being further characterized by a content of ascorbic acid in amount at least substantially equal to ascorbic acid content of raw whole milk.

9. As a new product, evaporated, canned and sterilized milk containing a dietary sufficiency of ascorbic acid and a colloidal suspension of assimilable protein-encapsulated particles of a phosphate of at least one of the metals of the group consisting of iron, copper and manganese.

10. As a new product, evaporated, canned and sterilized milk containing a dietary sufficiency of ascorbic acid and a colloidal suspension of assimilable protein-encapsulated particles of a phytate of at least one of the metals of the group consisting of iron, copper and manganese.

11. As a new product, evaporated, canned and sterilized milk containing a dietary sufficiency of ascorbic acid and a colloidal suspension of assimilable protein-encapsulated particles of a vitaminate of at least one of the metals iron, copper and manganese, said vitaminate being a vitaminate of a vitamin of the group consisting of vitamin A, vitamin D and vitamin E.

GEORGE E. GRINDROD.

REFERENCES CITED

The following references are of record in the file of this patent:

UNITED STATES PATENTS

| Number | Name | Date |
|---|---|---|
| 1,743,004 | Posternak et al. | Jan. 7, 1930 |
| 2,300,410 | Ferrari | Nov. 3, 1942 |
| 2,310,383 | Andrews et al. | Feb. 9, 1943 |
| 2,359,413 | Freedman | Oct. 3, 1944 |